US010234288B2

(12) United States Patent
Tallur et al.

(10) Patent No.: US 10,234,288 B2
(45) Date of Patent: Mar. 19, 2019

(54) DUAL MODE GYROSCOPE (71) Applicant: Analog Devices Global Unlimited Company, Hamilton (BM)

(72) Inventors: Siddharth Tallur, Mumbai (IN); Sunil Ashok Bhave, West Lafayette, IN (US)

(73) Assignee: Analog Devices Global Unlimited Company, Hamilton (BM)

( * ) Notice: Subject to any disclaimer, the term of this patent is extended or adjusted under 35 U.S.C. 154(b) by 580 days.

(21) Appl. No.: 14/853,265

(22) Filed: Sep. 14, 2015

(65) Prior Publication Data

US 2017/0074656 A1 Mar. 16, 2017

(51) Int. Cl.
*G01C 19/5677* (2012.01)
*G01C 19/5698* (2012.01)

(52) U.S. Cl.
CPC ..... *G01C 19/5698* (2013.01); *G01C 19/5677* (2013.01)

(58) Field of Classification Search
CPC .................. G01C 19/5698; G01C 19/5677
USPC ....................................... 73/504.13
See application file for complete search history.

(56) References Cited

U.S. PATENT DOCUMENTS

| 6,985,051 B2 * | 1/2006 | Nguyen | H03H 3/0072 |
| | | | 333/186 |
| 7,106,448 B1 * | 9/2006 | Vawter | G01C 19/72 |
| | | | 356/461 |
| 7,295,088 B2 * | 11/2007 | Nguyen | H03H 3/0072 |
| | | | 333/186 |

(Continued)

OTHER PUBLICATIONS

Ayazi et al., "Design and Fabrication of a High-Performance Polysilicon Vibrating Ring Gyroscope", Center for Integrated Sensors and Circuits, Eleventh IEEE/ASME International Workshop on Micro Electro Mechanical Systems, Heidelberg, Germany, Jan. 25-29, 1998.

(Continued)

*Primary Examiner* — J M Saint Surin
(74) *Attorney, Agent, or Firm* — Wolf, Greenfield & Sacks, P.C.

(57) ABSTRACT

A BAW gyroscope is configured to operate with two pairs of orthogonal modes instead of a single pair in order to mitigate the impact of changes in gaps (e.g., introduced from external stresses such as thermal gradients, external shocks, mechanical stress/torque, etc.). Specifically, the BAW gyroscope resonator is configured to be simultaneously driven to resonate with a two disparate resonant modes (referred to herein as the "fundamental" mode and the "compound" mode), with the same set of drive electrodes used to drive both resonant modes (i.e., all of the drive electrodes are used to drive the two drive modes). When the sensor experiences external rotation, energy couples from the driven modes of vibration to two corresponding orthogonal sense modes via the Coriolis force. The same set of sense electrodes is used to sense both sense modes (i.e., all of the sense electrodes are used to sense the two sense modes). The fundamental mode is differential with respect to the electrodes, while the compound mode is seen as common-mode with respect to the electrodes. Thus, differential gap change will impact offset of rate measured with the fundamental mode only, while common-mode gap change will impact offset of rate measured with the compound mode only.

19 Claims, 7 Drawing Sheets (56) References Cited

U.S. PATENT DOCUMENTS

| | | | |
|---|---|---|---|
| 8,151,641 B2 | 4/2012 | Geen | 73/504.12 |
| 8,616,055 B2 | 12/2013 | Geen | 73/504.12 |
| 8,803,624 B2* | 8/2014 | Phan Le | H03H 9/2431 |
| | | | 331/116 M |
| 9,599,471 B2* | 3/2017 | Vohra | G01C 19/5698 |
| 9,712,128 B2* | 7/2017 | Doll | H03H 9/17 |
| 2008/0115579 A1* | 5/2008 | Seeger | G01C 19/5712 |
| | | | 73/504.12 |

OTHER PUBLICATIONS

Ayazi et al., "High Aspect-Ratio Combined Poly and Single-Crystal Silicon (HARPSS) MEMS Technology;" Journal of Microelectromechanical Systems, vol. 9, No. 3, Sep. 2000.

Ayazi et al., "A HARPSS Polysilicon Vibrating Ring Gyroscope", Journal of Microelectromechanical Systems, vol. 10, No. 2, Jun. 2001.

Geen et al., "New iMEMS® Angular- Rate-Sensing Gyroscope", ADI Micromachined Products Division; Analog Dialogue 37-3, 2003.

Leland, "Adaptive Mode Tuning for Vibrational Syroscopes", IEEE Transaction on Control System Technology, vol. 11, No. 2, pp. 242-247, Mar. 2003.

Nguyen, "Micromechanical Resonators for Oscillators and Filters", IEEE Ultrasonics Symposium, vol. 1, pp. 489-499, Nov. 1995.

Oboe et al., "Control of a Z-Axis MEMS Vibrational Gyroscope", IEEE/ASME Transactions on Mechatronics, vol. 10, No. 4, pp. 364-370 , Aug. 2005.

Park et al., "Laterally Oscillated and Force-Balanced Micro Vibratory Rate Gyroscope Supported by Fish Hook Shape Springs", Proceedings of the IEEE $10^{th}$ Annual International Workshop on Micro Electro Mechanical Systems, pp. 494-499, Jan. 1997.

Tang et al., "A Packaged Silicon MEMS Vibratory Gyroscope for Microspacecraft," Proceedings of the IEEE $10^{th}$ Annual International Workshop on Micro Electro Mechanical Systems, pp. 500-505, Jan. 1997.

* cited by examiner

DUAL MODE GYROSCOPE

FIELD OF THE INVENTION

The present invention relates generally to bulk acoustic wave (BAW) gyroscopes.

BACKGROUND OF THE INVENTION

Micromachined (MEMS) gyroscopes have become established as useful commercial items. Generally speaking, a MEMS gyroscope incorporates two high-performing MEMS devices, specifically a self-tuned resonator in the drive axis and a micro-acceleration sensor in the sensing axis. Gyroscope performance is very sensitive to such things as manufacturing variations, errors in packaging, driving, linear acceleration, and temperature, among other things. Basic principles of operation of angular-rate sensing gyroscopes are well understood.

Conventionally, bulk acoustic wave (BAW) MEMS gyroscopes operate based on utilizing a pair of orthogonal modes to sense rotation. One of these modes is driven into self-sustained mechanical oscillations. When the sensor experiences external rotation, energy couples from the driven mode of vibration to the orthogonal mode via the Coriolis force. Sensing the energy coupled into the orthogonal mode forms the principle of operation of such MEMS gyroscopes.

Electrostatically actuated BAW gyroscopes typically utilize narrow air gaps (approximately around a few hundred nanometers) to efficiently actuate high frequency mechanical modes. Operating with small gaps makes the system vulnerable to any small changes in gap (for e.g. 5nm change in 100 nm gap corresponds to 5% change, as compared to 0.5% in 1 um gap). Changes in gaps amount to changes in sensitivity (scale factor) and zero-rate offset for these gyroscopes.

SUMMARY OF EXEMPLARY EMBODIMENTS

In certain embodiments, a bulk acoustic wave gyroscope comprises a resonator, a set of drive electrodes including at least one pair of opposed drive electrodes, a set of sense electrodes including at least one pair of opposed sense electrodes, and a gyroscope control circuit configured to provide drive signals to the set of drive electrodes to drive the resonator to resonate with two disparate drive modes including a fundamental mode and a compound mode, receive sense signals from the set of sense electrodes to sense two orthogonal sense modes of the resonator including a sensed fundamental mode and a sensed compound mode, and produce a gyroscope rate output signal based on a weighted sum of the sensed fundamental and compound modes.

In certain other embodiments, a method for operating a bulk acoustic wave gyroscope of the type described above comprises providing drive signals to the set of drive electrodes to drive the resonator to resonate with two disparate drive modes including a fundamental mode and a compound mode, receiving sense signals from the set of sense electrodes and sensing from the received sense signals two orthogonal sense modes of the resonator including a sensed fundamental mode and a sensed compound mode, and producing a gyroscope rate output signal based on a weighted sum of the sensed fundamental and compound modes.

In certain other embodiments, a gyroscope control circuit for a bulk acoustic wave gyroscope of the type described above comprises a fundamental mode driver configured to apply a differential signal across opposing drive electrodes of a set of drive electrodes at a fundamental mode frequency; a compound mode driver configured to apply a same polarity signal to opposing drive electrodes of the set of electrodes at a compound mode frequency; a fundamental mode sense circuit configured to demodulate sensed fundamental mode signals from opposing sense electrodes of a set of sense electrodes at the fundamental mode frequency; a compound mode sense circuit configured to demodulate sensed compound mode signals from opposing sense electrodes of the set of sense electrodes at the compound mode frequency; and a rate output circuit configured to produce a gyroscope rate output signal based on a weighted sum of the demodulated signals.

Thus, in various embodiments, the resonator may be driven by applying a differential signal across opposing drive electrodes at a fundamental mode frequency and applying a same polarity signal to opposing drive electrodes at a compound mode frequency. The two orthogonal sense modes may be sensed by demodulating sensed fundamental mode signals at the fundamental mode frequency and demodulating sensed compound mode signals at the compound mode frequency. The gyroscope rate output signal may be produced based on a weighted sum of the demodulated signals.

In various alternative embodiments, all of the drive electrodes may be used to drive both the fundamental mode and the compound mode, and all of the sense electrodes may be used to sense both of the sensed modes. The resonator may be ring-shaped or may be another appropriate shape (e.g., disk-shaped). The drive electrodes may be arranged to drive the drive modes along at least one drive axis, and the sense electrodes may be arranged to sense the sense modes along at least one sense axis that is 45 degrees offset from the at least one drive axis. In some embodiments, the fundamental mode frequency and the compound mode frequency may be the same, while in other embodiments, the modes may be different. Exemplary fundamental and compound modes include N=2 modes and N=3 modes.

In still other alternative embodiments, the fundamental mode driver may include a first output coupled to a first subset of the drive electrodes and a second output coupled to a second subset of the drive electrodes, and the compound mode driver may include an output coupled to all of the drive electrodes. The fundamental mode sense circuit may include a differential trans-impedance amplifier having a first input coupled to a first subset of the sense electrodes and a second input coupled to a second subset of the sense electrodes and may further include a demodulator coupled to receive an output of the differential trans-impedance amplifier, and the compound mode sense circuit may include a single-ended amplifier having an input coupled to the sense electrodes and a demodulator coupled to receive an output of the single-ended amplifier.

Additional embodiments may be disclosed and claimed.

BRIEF DESCRIPTION OF THE DRAWINGS

The foregoing features of embodiments will be more readily understood by reference to the following detailed description, taken with reference to the accompanying drawings, in which.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Definitions. As used in this description and the accompanying claims, the following terms shall have the meanings indicated, unless the context otherwise requires:

A "set" includes one or more members.

A "subset" includes one or more members from a set.

The "mode" of a resonating body is the shape of motion of the body at resonance.

The term "anti-phase" with respect to the resonant modes of two resonating bodies means that the resonating bodies resonate with the same mode shape but 180 degrees out-of-phase.

The term "in-plane" with respect to a resonant mode should be understood to mean resonance predominately in the plane of the resonator structure(s).

The term "out-of-plane" with respect to a resonant mode should be understood to mean resonance predominately normal to the plane of the resonator structure(s).

A "node" or "nodal point" with respect to a resonating body is a point or area of the resonant motion having zero or near zero displacement.

An "anti-node" with respect to a resonating body is a point or area of the resonant motion having the largest displacement.

An "electrode" is a structure through which an electrical or electromechanical effect is applied and/or sensed. In exemplary embodiments, various electrodes are used for applying and/or sensing electrical or electromechanical effects through capacitive coupling (e.g., between a resonant mass and one or more adjacent structures), although it should be noted that other types of electrodes and couplings may be used (e.g., piezoelectric). Thus, in exemplary embodiments, electrodes may include a resonant mass and one or more structures for driving and/or sensing movement of the resonant mass.

The term "um" is used as an abbreviation of "micrometer."

In exemplary embodiments of the present invention, the BAW gyroscope is configured to operate with two pairs of orthogonal modes instead of a single pair in order to mitigate the impact of changes in gaps (e.g., introduced from external stresses such as thermal gradients, external shocks, mechanical stress/torque, etc.). Specifically, the BAW gyroscope resonator is configured to be simultaneously driven to resonate with two disparate resonant modes (referred to herein as the "fundamental" mode and the "compound" mode), with the same set of drive electrodes used to drive both resonant modes (i.e., all of the drive electrodes are used to drive the two drive modes). When the sensor experiences external rotation, energy couples from the driven modes of vibration to two corresponding orthogonal sense modes via the Coriolis force. The same set of sense electrodes is used to sense both sense modes (i.e., all of the sense electrodes are used to sense the two sense modes). The fundamental mode is differential with respect to the electrodes, while the compound mode is seen as common-mode with respect to the electrodes. Thus, differential gap change will impact offset of rate measured with the fundamental mode only, while common-mode gap change will impact offset of rate measured with the compound mode only.

Some specific exemplary embodiments are described below with reference to BAW gyroscopes having a ring-shaped resonator.

Figure 1:
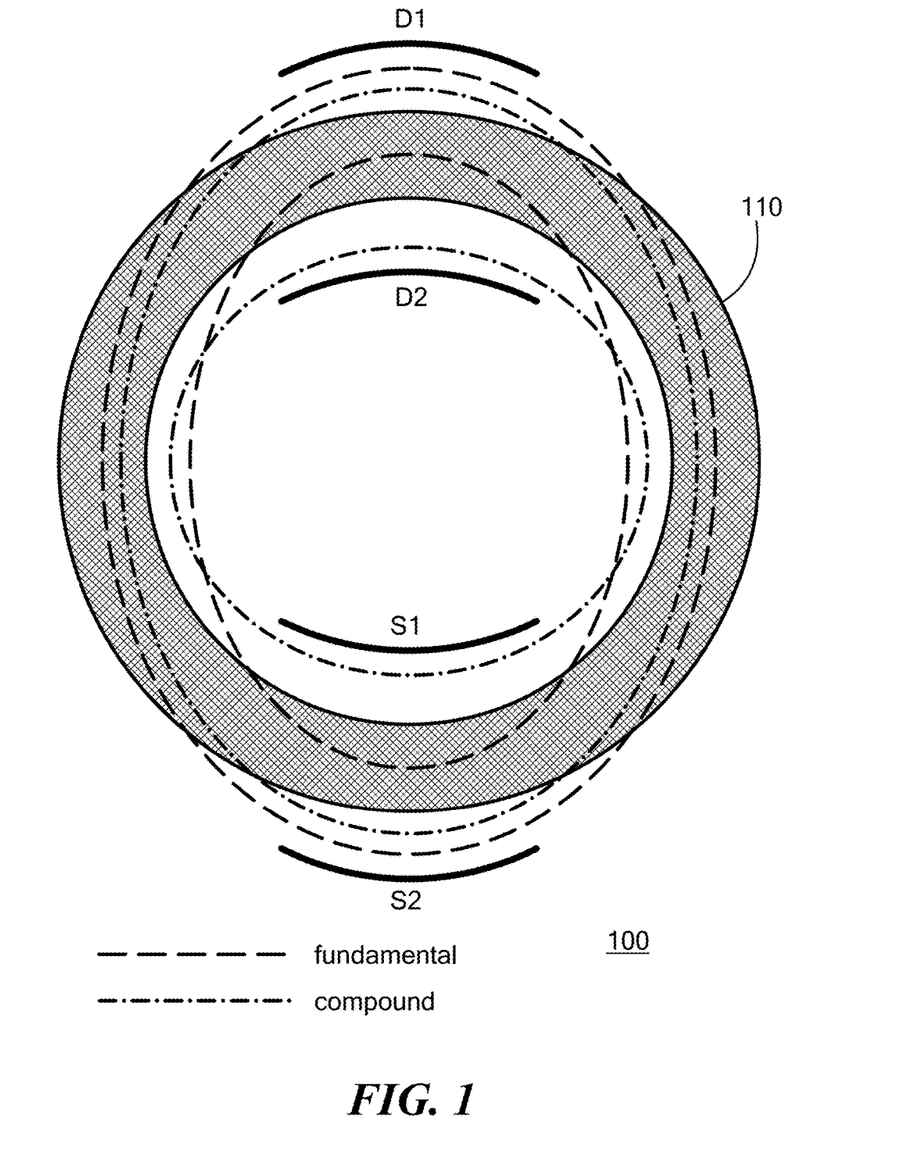
FIG. 1 is a schematic diagram of a BAW gyroscope configured to operate with two disparate resonant modes, in accordance with one exemplary embodiment of the present invention.

FIG. 1 is a schematic diagram of a BAW gyroscope 100 configured to operate with two disparate resonant modes, in accordance with one exemplary embodiment of the present invention. The BAW gyroscope 100 includes a ring-shaped resonator 110, a pair of in-plane drive electrodes D1 and D2, and a pair of in-plane sense electrodes S1 and S2. Here, drive electrodes D1 and D2 are used to drive the resonator 110 to resonate with both a fundamental mode and a compound mode. The fundamental mode depicted in FIG. 1 represents the N=2 "wineglass" mode of the device, where the outer and inner perimeters of the ring move in such a way that their respective motions track each other, i.e., if the inner perimeter moves radially outwards at a given point along the ring, then the outer perimeter also moves radially outwards at that point, and if the inner perimeter moves radially inwards at a given point along the ring, then the outer perimeter also moves radially inwards at that point. The compound mode exhibits the opposite behavior, i.e., if the inner perimeter moves radially outwards at a given point along the ring, then the outer perimeter moves radially inwards at that point, and if the inner perimeter moves radially inwards at a given point along the ring, then the outer perimeter moves radially outwards at that point.

With these mode families, the same pair of drive and sense electrodes can be used to interrogate these modes, allowing for gap change mitigation. Specifically, the polarity difference between the two modes is exploited to co-employ the electrodes. To drive the fundamental mode, a differential signal is applied across D1 and D2 (e.g., positive polarity at D1, negative polarity at D2). To drive the compound mode, a signal is applied at D1 and D2 with the same polarity. Similarly, to sense the fundamental mode using S1 and S2, a differential trans-impedance amplifier can be used and the sensed signal is demodulated at the fundamental mode frequency, whereas to sense the compound mode, a single-ended amplifier is connected to both S1 and S2 and the sensed signal is demodulated at the compound mode frequency. Because of how the polarities are differently oriented for both these mode families, they respond differently to common mode and differential gap changes. Specifically, the rate sensed using the fundamental mode will be susceptible to offset shifts due to differential gap change at S1 and S2. The compound mode, on the other hand, is susceptible to common-mode gap change at S1 and S2. By operating both gyroscope modes simultaneously and using a weighted sum of the rate outputs to define the total rate output, the impact of gap change on offset is expected to be reduced compared to operating either mode individually across all operating conditions.

In one specific exemplary embodiment, the resonant frequencies of the two mode families are widely spaced apart, e.g., the fundamental mode lies at around 2 MHz (e.g., 2.06 MHz), while the compound mode lies at around 14 MHz (e.g., 14.2 MHz). The outer perimeter of the ring-shaped resonator 110 has a diameter of around 500 um and the inner perimeter of the ring-shaped resonator 110 has a diameter of around 200 um. The ring-shaped resonator 110 has a thickness of around 40 um.

While FIG. 1 shows the sense electrodes S1 and S2 aligned with the drive electrodes D1 and D2, in actuality, the drive electrodes D1 and D2 are generally positioned for driving the fundamental and compound drive modes along a drive axis, while the sense electrodes S1 and S2 are generally positioned for sensing the orthogonal fundamental and compound sense modes along a sense axis offset from the drive axis.

Figure 2A:
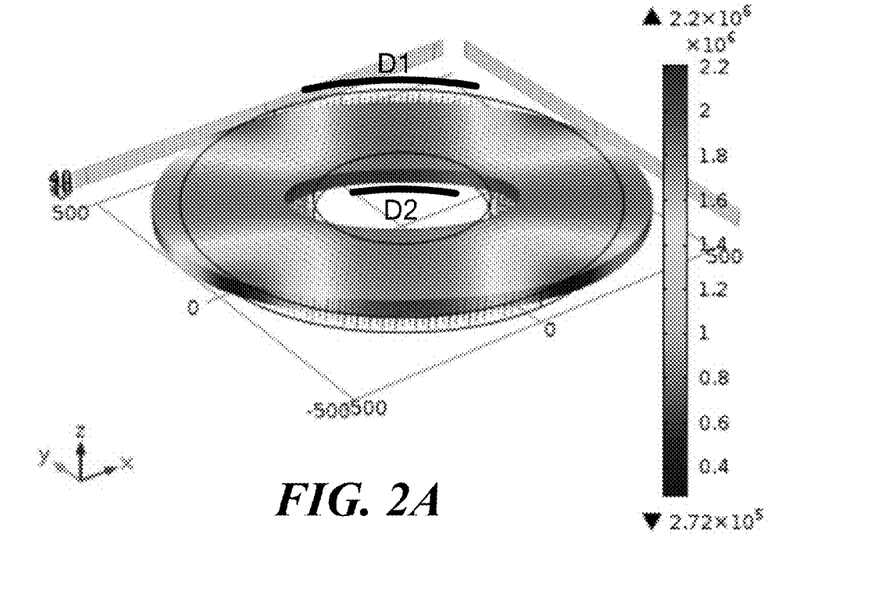
FIG. 2A is a schematic diagram showing the position of a pair of drive electrodes for an N=2 fundamental resonant mode, in accordance with the exemplary embodiment shown in FIG. 1.
Figure 2B:
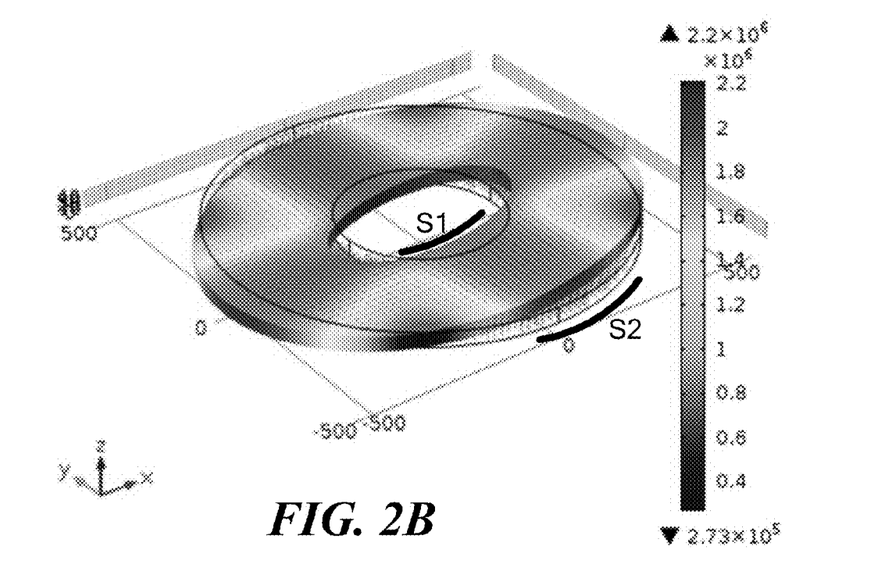
FIG. 2B is a schematic diagram showing the position of a pair of sense electrodes for an N=2 fundamental resonant mode, in accordance with the exemplary embodiment shown in FIG. 1.
Figure 2C:
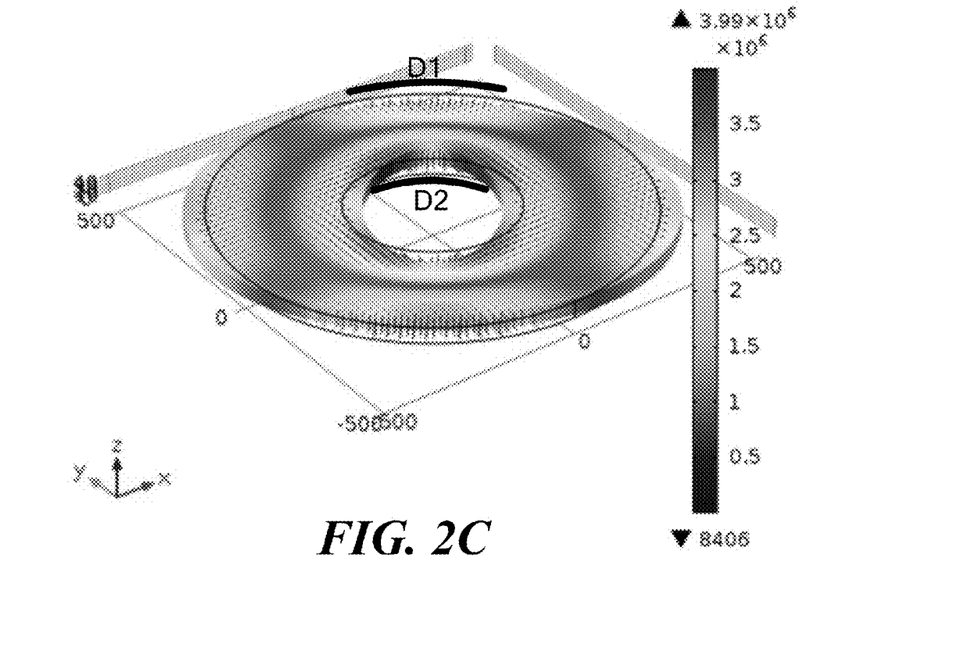
FIG. 2C is a schematic diagram showing the position of a pair of drive electrodes for an N=2 compound resonant mode, in accordance with the exemplary embodiment shown in FIG. 1.
Figure 2D:
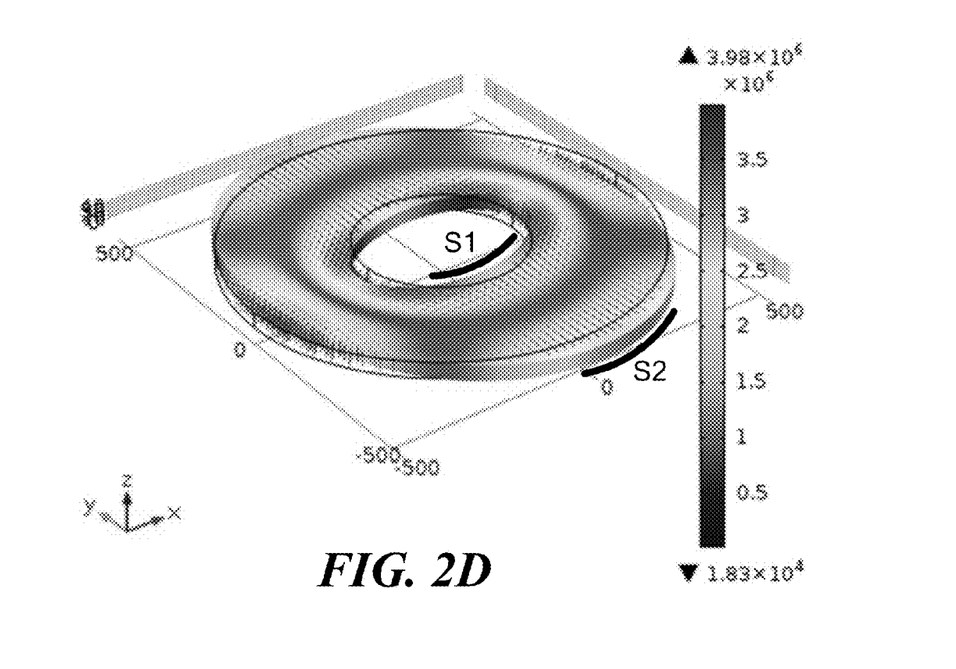
FIG. 2D is a schematic diagram showing the position of a pair of sense electrodes for an N=2 compound resonant mode, in accordance with the exemplary embodiment shown in FIG. 1.

FIGS. 2A-2D are schematic diagrams showing additional details of the N=2 fundamental and compound modes, in accordance with the exemplary embodiment shown in FIG. 1. FIG. 2A and FIG. 2C show the position of the drive electrodes D1 and D2 with respect to the fundamental and compound drive modes, respectively. FIG. 2B and FIG. 2D show the position of the sense electrodes S1 and S2 with respect to the fundamental and compound sense modes, respectively. In this exemplary embodiment, the sense axis is offset approximately 45 degrees from the drive axis.

As discussed above, with these mode families, the same pair of drive and sense electrodes can be used to interrogate these modes, allowing for gap change mitigation. Specifically, the polarity difference between the two modes is exploited to co-employ the electrodes. To drive the fundamental mode, a differential signal is applied across D1 and D2 (e.g., positive polarity at D1, negative polarity at D2). To drive the compound mode, a signal is applied at D1 and D2 with the same polarity. Similarly, to sense the fundamental mode using S1 and S2, a differential trans-impedance amplifier can be used and the sensed signal is demodulated at the fundamental mode frequency, whereas to sense the compound mode, a single-ended amplifier is connected to both S1 and S2 and the sensed signal is demodulated at the compound mode frequency. Because of how the polarities are differently oriented for both these mode families, they respond differently to common mode and differential gap changes. Specifically, the rate sensed using the fundamental mode will be susceptible to offset shifts due to differential gap change at S1 and S2. The compound mode, on the other hand, is susceptible to common-mode gap change at S1 and S2. By operating both gyroscope modes simultaneously and using a weighted sum of the rate outputs to define the total rate output, the impact of gap change on offset is expected to be reduced compared to operating either mode individually across all operating conditions.

Figure 3:
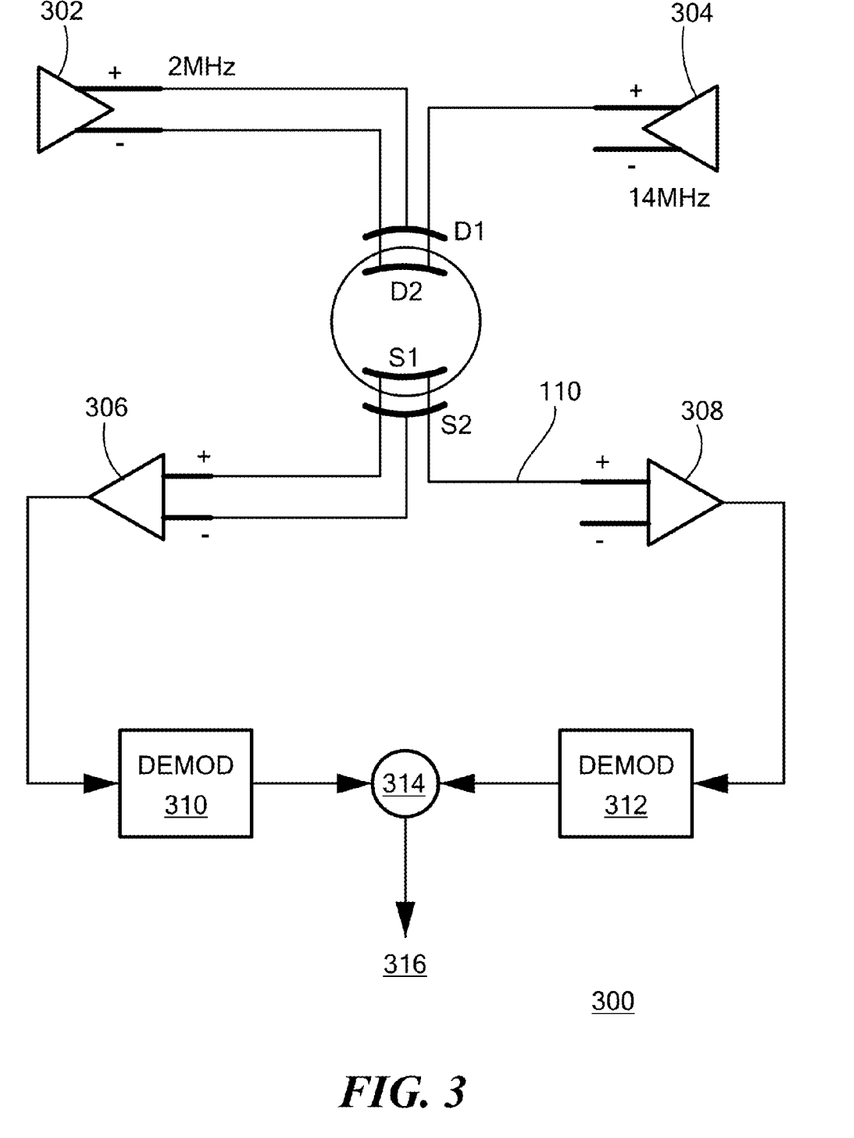
FIG. 3 is a schematic diagram of an exemplary gyroscope control circuit for a BAW gyroscope in accordance with the exemplary embodiments shown in FIGS. 1 and 2.

FIG. 3 is a schematic diagram of an exemplary gyroscope control circuit 300 for a BAW gyroscope in accordance with the exemplary embodiments shown in FIGS. 1 and 2. The circuit 300 includes a driver 302 configured to apply a differential signal across drive electrodes D1 and D2 (e.g., positive polarity at D1, negative polarity at D2) in order to drive the fundamental mode. The circuit 300 also includes a driver 304 configured to apply a signal to drive electrodes D1 and D2 with the same polarity in order to drive the compound mode. To sense the fundamental mode, the sense electrodes S1 and S2 are coupled to the inputs of a differential trans-impedance amplifier 306, and the sensed signal from the differential trans-impedance amplifier 306 is demodulated by demodulator 310 at the fundamental mode frequency. To sense the compound mode, the sense electrodes S1 and S2 are connected to a single-ended amplifier 308, and the sensed signal from the single-ended amplifier 308 is demodulated by demodulator 312 at the compound mode frequency. The rate outputs from the demodulators 310 and 312 are combined by a weighted sum combiner 314 to produce the total rate output signal 316. As discussed above, by operating both gyroscope modes simultaneously and using a weighted sum of the rate outputs to define the total rate output, the impact of gap change on offset is expected to be reduced compared to operating either mode individually across all operating conditions.

It should be noted that alternative embodiments may include additional drive and/or sense electrodes.

Figure 4:
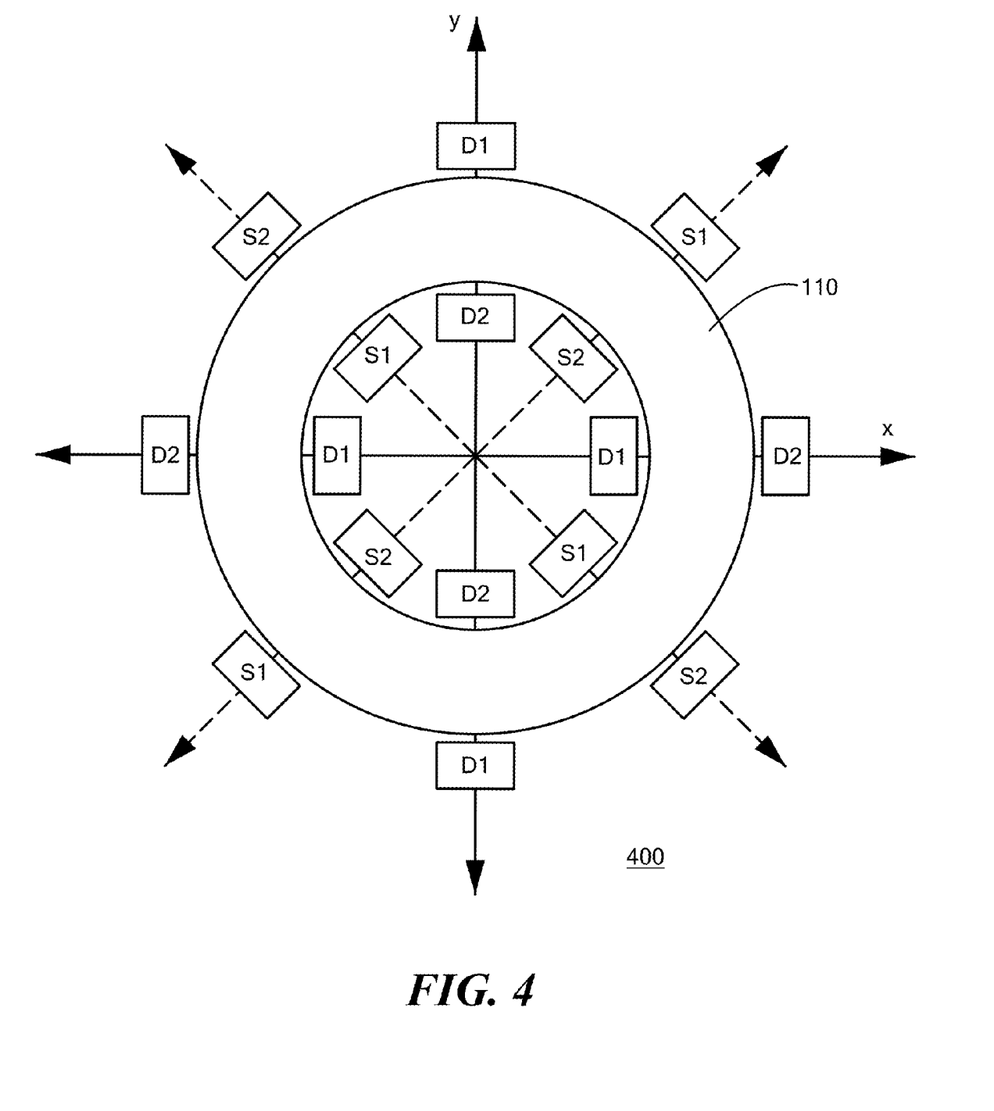
FIG. 4 is a schematic diagram showing an electrode configuration for an alternative BAW gyroscope embodiment that operates substantially as the embodiments shown in FIGS. 1-3.

FIG. 4 is a schematic diagram showing an electrode configuration for an alternative BAW gyroscope embodiment that operates substantially as the embodiments shown in FIGS. 1-3. Here, four sets of drive electrodes are aligned with the X and Y axes, and four sets of sense electrodes are aligned with axes offset by 45 degrees from the X and Y axes. The electrodes are arranged and electrically connected so that all D1 electrodes are electrically coupled with one another, all D2 electrodes are electrically coupled with one another, all S1 electrodes are electrically coupled with one another, and all S2 electrodes are electrically coupled with one another.

It should be noted that, although some exemplary embodiments are described above with reference to N=2 modes in a BAW gyroscope having a ring-shaped resonator, various alternative embodiments may use different resonator configurations (e.g., solid disk) and/or different resonant modes (e.g., N=3, N=4, etc.), other modes may be used in various alternative embodiments. Generally speaking, drive electrodes would be placed at the anti-nodes of the driven resonance, while sense electrodes would be placed at the anti-nodes of the sensed resonance.

Also, it should be noted that, although some exemplary embodiments are described above with reference to fundamental and compound modes having different resonance frequencies, various alternative embodiments may be operated in a mode-matched configuration, i.e., in which the fundamental and compound modes have the same resonance frequency.

Also, it should be noted that, although some exemplary embodiments are described above with reference to drive and sense modes that are in-plane, various alternative embodiments may be configured to operate in other ways, e.g., driving in-plane resonant modes and sensing orthogonal out-of-plane resonant modes, or driving out-of-plane resonant modes and sensing orthogonal in-plane resonant modes. For such modes, one set of electrodes would be placed out-of-plane, e.g., on an underlying substrate, at the anti-nodes of the out-of-plane modes.

Figure 5A:
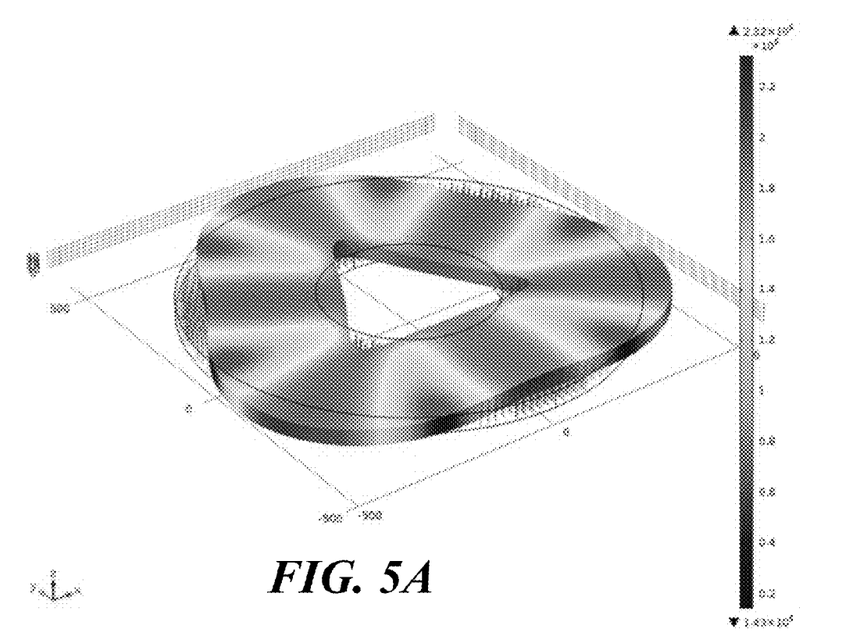
FIG. 5A is a schematic diagram showing an N=3 driven fundamental resonant mode at around 4.5 MHz, in accordance with one alternative embodiment.
Figure 5B:
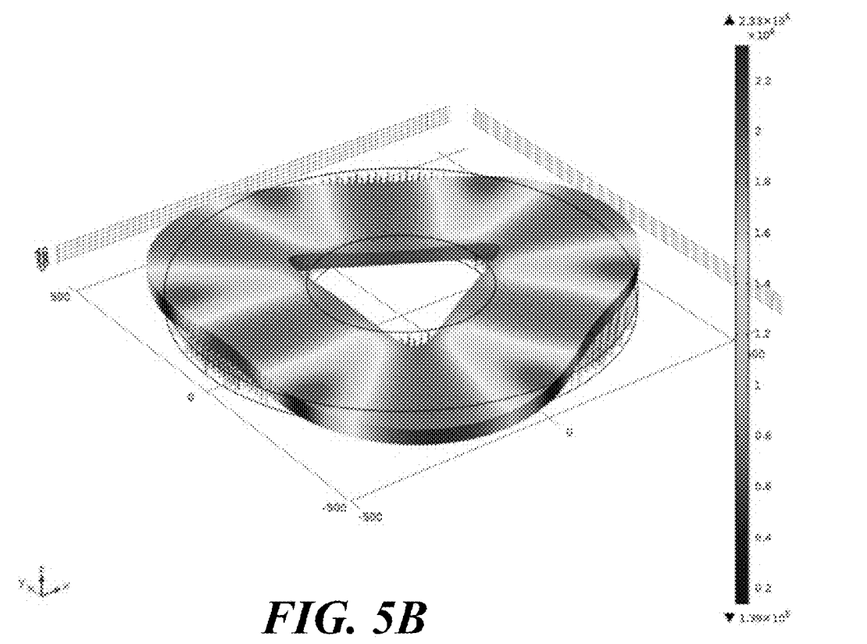
FIG. 5B is a schematic diagram showing the orthogonal N=3 sensed fundamental resonant mode for the driven fundamental resonant mode shown in FIG. 5A.
Figure 5C:
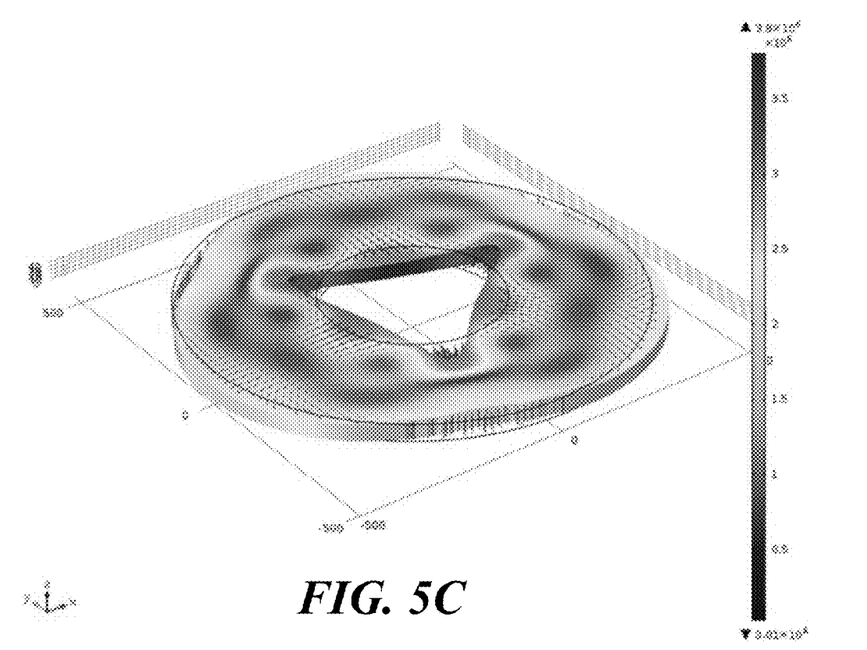
FIG. 5C is a schematic diagram showing an N=3 driven compound resonant mode at around 14 MHz, in accordance with one alternative embodiment.
Figure 5D:
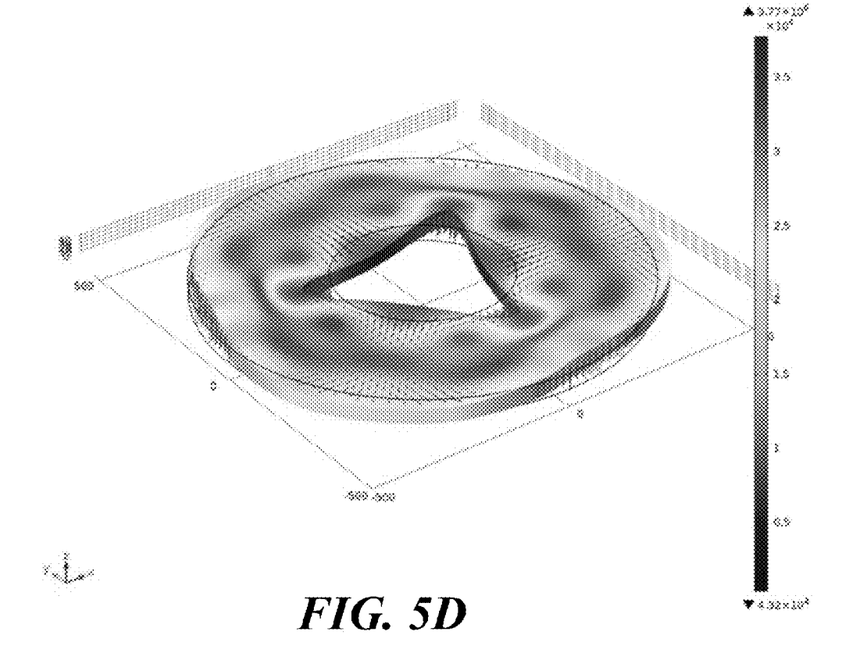
FIG. 5D is a schematic diagram showing the orthogonal N=3 sensed compound resonant mode for the driven compound resonant mode shown in FIG. 5C.

FIGS. 5A-5D are schematic diagrams showing N=3 resonant modes for a BAW gyroscope having a ring-shaped resonator, in accordance with one alternative embodiment. FIG. 5A shows an N=3 driven fundamental mode at around 4.5 MHz, while FIG. 5B shows the orthogonal N=3 sensed fundamental mode. FIG. 5C shows the N=3 driven compound mode at around 14 MHz, while FIG. 5D shows the orthogonal N=3 sensed compound mode. These N=3 resonant modes may be particularly applicable for BAW gyroscopes fabricated from <100> silicon wafers and operated in a mode-matched configuration (i.e., with both resonant modes at the same frequency), as the anisotropic nature of the material is expected to make it difficult to operate the N=2 modes in mode-matched configuration.

The following table highlights preliminary expected results for the N=2 and N=3 resonant mode configurations described above with reference to FIGS. 2 and 5:

|  | Design Types | | | |
| --- | --- | --- | --- | --- |
|  | N = 2 fundamental mode | N = 2 compound mode | N = 3 fundamental mode | N = 3 compound mode |
| Radius | Rout = 500 µm, Rin = 200 µm | | Rout = 500 µm, Rin = 200 µm | |
| Thickness | 40 µm | | 4 µm | |
| Gap | 200 nm | | 200 nm | |
| Effective mass/mass of structure | 0.63 | 0.22 | 0.57 | 0.23 |
| Freq. | 2.06 MHz | 14.2 MHz | 4.5 MHz | 14.5 MHz |
| Quality Factor | 20,000 | 10,000 | 20,000 | 10,000 |
| Angular Gain | 0.75 | 0.45 | 0.53 | 0.1 |
| VDC | 40 V | | 40 V | |
| Vac (amplitude) for $1/10^{th}$ gap drive (2 pairs of electrodes) | 0.09 V | 3.2 V | 0.4 V | 3.2 V |
| Electrode span | 24° | | 24° | |
| $C_0$ | 0.37 pF (single electrode) | | 0.37 pF (single electrode) | |
| Drive amplitude | 20.15 nm | 20.37 nm | 20.59 nm | 20.88 nm |
| $I_{sense}$ (sense motion current, nA/°/s) | 1.22 | 0.36 | 0.87 | 0.084 |
| mechanical noise (m°/sec/√Hz) | 2.45 | 3.66 | 2.4 | 16.04 |

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A bulk acoustic wave gyroscope comprising:
   a resonator;
   a set of drive electrodes including a pair of opposed drive electrodes;
   a set of sense electrodes including a pair of opposed sense electrodes; and
   a gyroscope control circuit configured to provide drive signals to the set of drive electrodes to drive the resonator to resonate with two disparate drive modes including a fundamental mode and a compound mode, receive sense signals from the pair of opposed sense electrodes to sense two orthogonal sense modes of the resonator including a sensed fundamental mode and a sensed compound mode, and produce a gyroscope rate output signal based on a weighted sum of the sensed fundamental and compound modes,
   wherein the gyroscope control circuit is configured to sense a differential sensed signal across the pair of opposed sense electrodes at a fundamental mode frequency, and to sense a same polarity sensed signal at the pair of opposed sense electrodes at a compound mode frequency.

2. A gyroscope according to claim 1, wherein all of the drive electrodes are used to drive both the fundamental mode and the compound mode, and wherein all of the sense electrodes are used to sense both of the sensed modes.

3. A gyroscope according to claim 1, wherein the resonator is a ring-shaped resonator.

4. A gyroscope according to claim 1, wherein the drive electrodes are arranged to drive the drive modes along at least one drive axis, and wherein the sense electrodes are arranged to sense the sense modes along at least one sense axis that is 45 degrees offset from the at least one drive axis.

5. A gyroscope according to claim 1, wherein the fundamental mode frequency and the compound mode frequency are different.

6. A gyroscope according to claim 1, wherein the fundamental mode frequency and the compound mode frequency are the same.

7. A gyroscope according to claim 1, wherein the fundamental mode and the compound mode are N=2 modes.

8. A gyroscope according to claim 1, wherein the fundamental mode and the compound mode are N=3 modes.

9. A gyroscope according to claim 1, wherein the gyroscope control circuit comprises:
   a fundamental mode driver configured to apply a differential signal across the pair of opposed drive electrodes at the fundamental mode frequency;
   a compound mode driver configured to apply a same polarity signal to the pair of opposed drive electrodes at the compound mode frequency;

a fundamental mode sense circuit configured to demodulate sensed fundamental mode signals at the fundamental mode frequency;

a compound mode sense circuit configured to demodulate sensed compound mode signals at the compound mode frequency; and a rate output circuit configured to produce the gyroscope rate output signal based on a weighted sum of the demodulated signals.

10. A gyroscope according to claim 9, wherein the pair of opposed drive electrodes is a first pair of opposed drive electrodes and the set of drive electrodes further comprises a second pair of opposed drive electrodes, and wherein the fundamental mode driver comprises a first output coupled to a first electrode of the second pair of opposed drive electrodes and a second output coupled to a second electrode of the second pair of opposed drive electrodes, and wherein the compound mode driver comprises an output coupled to the first and second electrodes of the second pair of opposed drive electrodes.

11. A gyroscope according to claim 9, wherein the fundamental mode sense circuit comprises a differential transimpedance amplifier having a first input coupled to a first electrode of the pair of opposed sense electrodes and a second input coupled to a second electrode of the pair of opposed sense electrodes and further comprises a demodulator coupled to receive an output of the differential transimpedance amplifier, and wherein the compound mode sense circuit comprises a single-ended amplifier having an input coupled to the first and second electrodes of the pair of opposed sense electrodes and a demodulator coupled to receive an output of the single-ended amplifier.

12. A method for operating a bulk acoustic wave gyroscope having a resonator, a set of drive electrodes including a pair of opposed drive electrodes, and a set of sense electrodes including a pair of opposed sense electrodes, the method comprising:

applying a differential signal across the pair of opposed drive electrodes to drive the resonator to resonate with a fundamental mode;

applying a signal with a same polarity to the pair of opposed drive electrodes to drive the resonator to resonate with a compound mode;

receiving sense signals from the set of sense electrodes and sensing from the received sense signals two orthogonal sense modes of the resonator including a sensed fundamental mode and a sensed compound mode; and producing a gyroscope rate output signal based on a weighted sum of the sensed fundamental and compound modes.

13. A method according to claim 12, wherein:

the differential signal has a fundamental mode frequency and the signal with the same polarity has a compound mode frequency;

sensing the two orthogonal sense modes comprises demodulating sensed fundamental mode signals at the fundamental mode frequency and demodulating sensed compound mode signals at the compound mode frequency; and producing the gyroscope rate output signal comprises producing the gyroscope rate output signal based on a weighted sum of the demodulated signals.

14. A method according to claim 13, wherein the fundamental mode frequency and the compound mode frequency are different.

15. A method according to claim 13, wherein the fundamental mode frequency and the compound mode frequency are the same.

16. A gyroscope comprising:

a resonator;

a set of drive electrodes including a pair of opposed drive electrodes;

a set of sense electrodes including a pair of opposed sense electrodes; and a gyroscope control circuit configured to provide a differential signal across the pair of opposed drive electrodes to drive the resonator to resonate with a first drive mode at a first frequency, provide a signal with a same polarity to the pair of opposed drive electrodes to drive the resonator to resonate with a second drive mode at a second frequency, receive sense signals from the set of sense electrodes to sense a first sensed mode and a second sensed mode of the resonator, and produce a gyroscope rate output signal based on a weighted sum of received sense signals representing the first sensed mode and received sense signals representing the second sensed mode.

17. A gyroscope according to claim 16, wherein the resonator is a ring-shaped resonator.

18. A gyroscope according to claim 16, wherein the set of drive electrodes are arranged to drive the drive modes along at least one drive axis, and wherein the set of sense electrodes are arranged to sense the sense modes along at least one sense axis that is 45 degrees offset from the at least one drive axis.

19. A gyroscope according to claim 16, wherein the gyroscope control circuit is further configured to demodulate received sense signals at the first frequency and the second frequency, and to produce the gyroscope rate output signal based on a weighted sum of the demodulated signals.

* * * * *